(12) United States Patent
Lee

(10) Patent No.: US 9,618,131 B2
(45) Date of Patent: Apr. 11, 2017

(54) ONE WAY VALVE

(71) Applicant: William Lee, Taipei (TW)

(72) Inventor: William Lee, Taipei (TW)

( * ) Notice: Subject to any disclaimer, the term of this patent is extended or adjusted under 35 U.S.C. 154(b) by 0 days.

(21) Appl. No.: 14/794,526

(22) Filed: Jul. 8, 2015

(65) Prior Publication Data

US 2017/0009898 A1 Jan. 12, 2017

(51) Int. Cl.
*F16K 7/17* (2006.01)
*F16K 15/14* (2006.01)

(52) U.S. Cl.
CPC ............ *F16K 15/148* (2013.01); *F16K 7/17* (2013.01)

(58) Field of Classification Search
CPC .... F16K 15/148; F16K 7/17; Y10T 137/7879; Y10T 137/7887; Y10T 137/789; Y10T 137/6065; Y10T 137/6086; Y10T 137/7837; Y10T 137/7859; Y10T 137/7862
USPC ...... 137/843, 851, 854, 315.27, 315.33, 511, 137/516.11, 516.17; 251/331, 333, 335.2, 251/357, 362
See application file for complete search history.

(56) References Cited

U.S. PATENT DOCUMENTS

| | | | | |
|---|---|---|---|---|
| 2,270,333 A | * | 1/1942 | Osborn, Jr. | F16K 17/196 137/511 |
| 2,579,855 A | * | 12/1951 | Pockel | F16K 15/148 137/854 |
| 3,059,637 A | * | 10/1962 | Senne | B63C 11/12 128/206.22 |
| 3,949,780 A | * | 4/1976 | Buckman | F16K 15/148 137/315.33 |
| 4,513,784 A | * | 4/1985 | Farrand | F16K 15/148 137/516.11 |
| 4,565,214 A | * | 1/1986 | Parman | F16K 15/148 137/512.15 |
| 4,607,627 A | * | 8/1986 | Leber | A61H 13/005 417/413.1 |
| 4,805,661 A | * | 2/1989 | Knapp | F16K 11/0746 137/217 |
| 4,904,236 A | * | 2/1990 | Redmond | A61M 27/006 137/854 |
| 4,958,633 A | * | 9/1990 | Angell | A62B 9/02 128/201.19 |
| 5,027,784 A | * | 7/1991 | Osawa | F01M 13/0011 123/572 |
| 5,067,449 A | * | 11/1991 | Bonde | F01M 13/00 123/41.86 |

(Continued)

*Primary Examiner* — Kevin Murphy
*Assistant Examiner* — Minh Le
(74) *Attorney, Agent, or Firm* — Muncy, Geissler, Olds & Lowe, P.C.

(57) ABSTRACT

A one way valve is revealed. The one way valve includes a valve seat and a valve member supported by the valve seat. A hole is mounted at a center of the valve base while an outer circular base is disposed around the hole and an inner circular base is arranged at a center of the hole. The inner circular base has a circular sidewall around an opening. At least one gap is radially formed on the circular sidewall and the gap is vertically penetrating the circular sidewall. The valve member consists of a membrane portion and a rod portion extended from one side of the membrane portion. Thereby the rod portion is passed through the gap of the inner circular base to be set into the opening of the inner circular base.

7 Claims, 6 Drawing Sheets

(56) References Cited

U.S. PATENT DOCUMENTS

| | | | | |
|---|---|---|---|---|
| 5,129,426 A * | 7/1992 | Boehmer | F16K 15/148 | 137/798 |
| 5,231,982 A * | 8/1993 | Harrison | A62B 18/10 | 128/201.28 |
| 5,307,836 A * | 5/1994 | Niceley | B60T 17/06 | 137/576 |
| 5,419,366 A * | 5/1995 | Johnston | F16K 15/148 | 137/493.7 |
| 5,507,318 A * | 4/1996 | Israelson | F04B 53/1065 | 137/854 |
| 5,526,843 A * | 6/1996 | Wolf | B60K 15/03519 | 137/550 |
| 5,619,972 A * | 4/1997 | Kuenzli | F02M 69/54 | 123/457 |
| 5,881,686 A * | 3/1999 | Schmidt | F01M 13/023 | 123/41.86 |
| 5,890,234 A * | 4/1999 | Lan | B63C 11/12 | 128/201.28 |
| 5,937,850 A * | 8/1999 | Kawashima | A62B 18/10 | 128/201.11 |
| 6,062,248 A * | 5/2000 | Boelkins | F16K 15/148 | 137/118.02 |
| 6,129,116 A * | 10/2000 | Laskowski | A47L 9/1427 | 137/526 |
| 6,516,829 B1 * | 2/2003 | Townsend | B60T 17/004 | 137/512.15 |
| 6,889,707 B2 * | 5/2005 | Nicolino | F16K 15/148 | 137/513.3 |
| 7,328,699 B2 * | 2/2008 | Kawashima | B63C 11/12 | 128/201.27 |
| 7,988,266 B2 * | 8/2011 | Xiao | B41J 2/17513 | 251/84 |
| 8,128,385 B2 * | 3/2012 | Takemi | F04B 39/1013 | 137/856 |
| 8,360,105 B2 * | 1/2013 | Cashen | F16K 24/06 | 137/526 |
| 8,434,633 B2 | 5/2013 | Beer et al. | | |
| 8,776,831 B2 * | 7/2014 | Otsuka | F16K 15/148 | 137/512.15 |
| 8,851,053 B2 * | 10/2014 | Shudo | F02D 19/02 | 123/527 |
| 2005/0126649 A1 * | 6/2005 | Onishi | F04B 43/046 | 137/854 |
| 2008/0078395 A1 * | 4/2008 | Ho | A61M 16/208 | 128/205.24 |
| 2008/0142102 A1 * | 6/2008 | Savard | F04B 43/067 | 137/854 |
| 2012/0305607 A1 * | 12/2012 | Geiger | B65D 47/2025 | 222/494 |
| 2012/0318243 A1 * | 12/2012 | Williams | F02M 25/0836 | 123/520 |
| 2014/0373953 A1 * | 12/2014 | Spanevello | F16K 15/148 | 137/854 |
| 2015/0090357 A1 * | 4/2015 | Yang | F16K 15/148 | 137/843 |

\* cited by examiner

ONE WAY VALVE

BACKGROUND OF THE INVENTION

The present invention relates to a one way valve, especially to a one way valve easy to be assembled and disassembled.

A conventional one way valve with a membrane is suitable to be mounted on an opening of an air chamber. The one way valve prevents fluid outside from flowing into the air chamber through the membrane by deformable membrane while fluid in the air chamber is able to flow out through the deformable membrane. By defamation of the membrane, the one way valve is switched from a closing state to an opening state. The membrane is set on a valve seat and used for preventing the fluid from flowing through one side of the valve seat. When the membrane is deformed, the fluid is flowing out from the opposite side of the valve seat. The membrane is formed by a membrane part and a stem part projecting from one side of the membrane part. In order to assemble the membrane on the valve seat, the stem part is axially inserted through a mounting hole of the valve seat to be out of the other side of the mounting hole. Then the stem part is pulled axially to a preset position to make the membrane part contact with a circumference of an inlet of the valve seat and cover the while inlet. However, the assembly or replacement of the membrane is getting quite difficult once the valve seat is welded to a sidewall of an opening of a container.

Refer to U.S. Pat. No. 8,434,633, a one way valve for a flexible package is revealed. A bulbous head at a free end of a stake is moved axially and passed through an opening on a septum so as to mount and position the septum to a base member. In order to improve convenience in installation and replacement of the membrane with respective to the valve seat, there is a need to improve the one way valve. The improved one way valve is easy to be mounted or replaced while being connected to an opening of a container. Moreover, the improved structure of the one way valve can also increase the production efficiency. Thereby the cost is reduced and the production capacity is increased.

SUMMARY OF THE INVENTION

Therefore it is a primary object of the present invention to provide a one way valve that overcomes shortcomings of conventional one way valve and gets easier to be assembled and disassembled.

In order to achieve the above object, a one way valve of the present invention includes a valve seat and a valve member. The valve seat is composed of an outer circular base, an inner circular base, and a plurality of ribs. The outer circular base is set around a hole while the inner circular base is disposed at a center of the hole and having a circular sidewall around an opening. The opening and the hole are concentric. The ribs are radially extended from the circular sidewall to an inner sidewall of the outer circular base to divide the hole. The valve member s installed at the valve seat and used for opening the hole at a first state or closing the hole at a second state. The valve member is formed by a membrane portion and a rod portion. The membrane portion contacts a part of the outer circular base around the hole. While in a first state, the membrane portion is in contact with the whole circumference of the hole thereof so as to close the hole on the valve seat. While in a second state, at least a part of the membrane portion originally in contact with the outer circular base is apart from each other, allowing the fluid to pass through the hole of the valve seat. The membrane portion is switched from the first state to the second by deformation. As to the rod portion, it includes a fixing end connected to one side of the membrane portion and a movable end opposite to the fixing end. The rod portion can be inserted through the opening of the inner circular base. Moreover, at least one gap is set radially on the circular sidewall of the inner base of the valve seat and is vertically penetrating the circular sidewall. Thus the rod portion of the valve member is radially passed through the gap of the inner circular base and set into the opening of the inner circular base.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
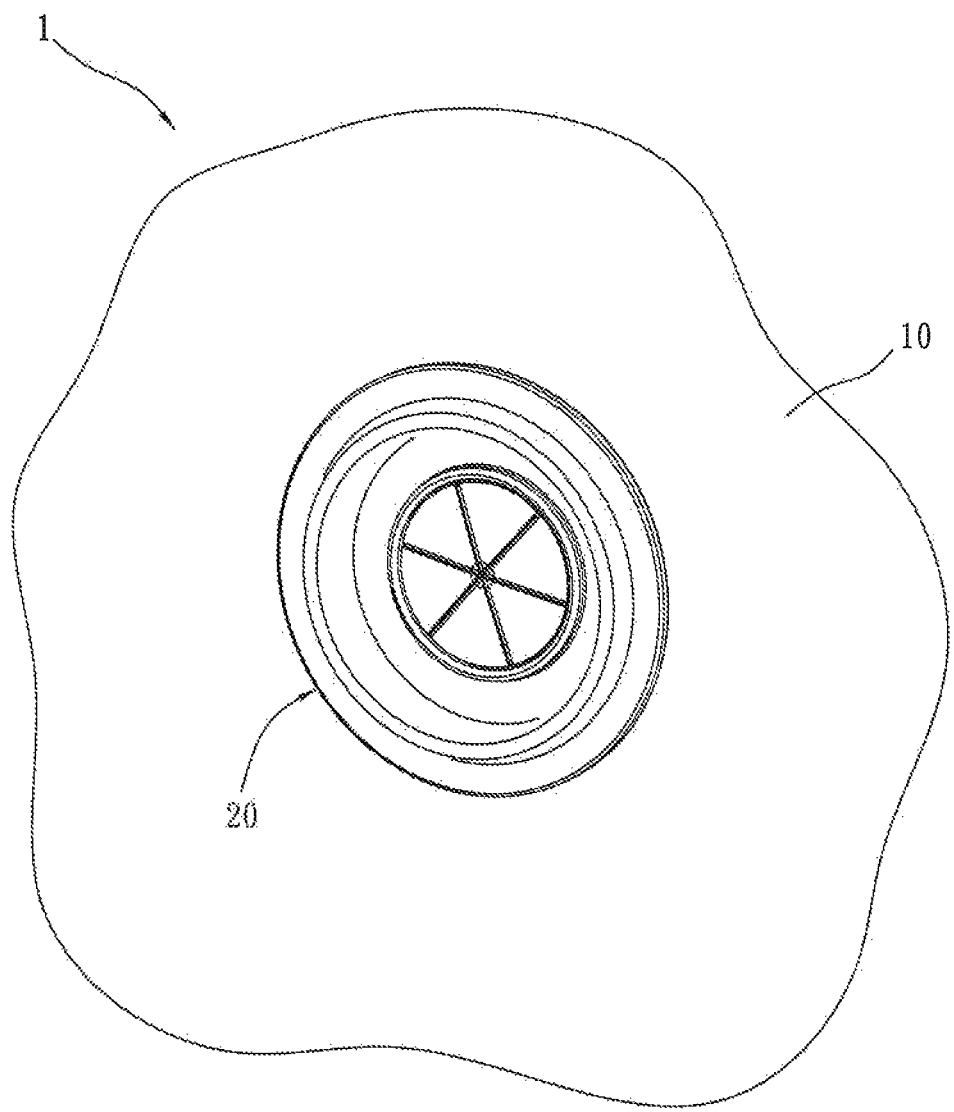
FIG. 1 is a perspective view of a container disposed with a one-way valve of a prior art.

Refer to FIG. 1, a conventional package container 1 includes a container 10 and a one-way valve 20. Generally, the container 10 consists of at least a front wall and a rear wall. The periphery of the front wall and the periphery of the rear wall are connected and sealed to form an inner space. A hole (not shown in FIG. 1) is disposed on one wall of the container 10 for mounting the one-way valve 20. While in use, fluid such as liquid, gas, etc. outside the container is unable to enter the inner space of the container 10 due to the one-way valve 20.

Figure 2:
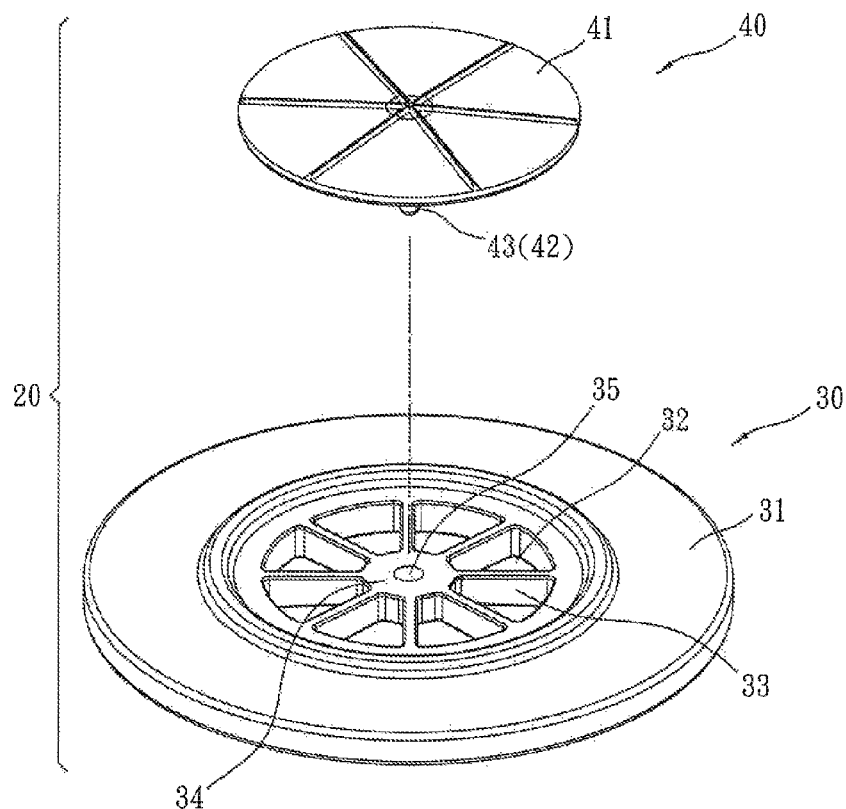
FIG. 2 is an explosive view of a conventional one-way valve that is suitable for the container in FIG. 1.
Figure 3:
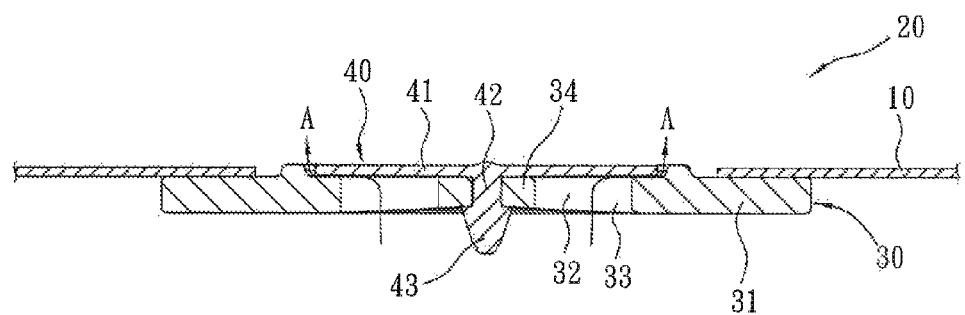
FIG. 3 is a longitudinal sectional view of a conventional one-way valve that is suitable for the container in FIG. 1.

Refer to FIG. 2 and FIG. 3, a conventional one-way valve is revealed while an embodiment of a one-way valve according to the present invention is disclosed in FIG. 4 to FIG. 8.

Refer to FIG. 2, an explosive view of a conventional one-way valve 20 is disclosed. The one-way valve 20 includes a base 30 and a valve member 40. The one-way valve 20 is mounted on the container 10 (as shown in FIG. 1) so that a flange 31 of the base 30 is located in the container 10. The base 30 is inserted through the hole on the container 1 and the flange 31 of the base 30 is welded or attached to the container 10 so as to fix and seal the base 30 on the container 10.

The valve member 40 of the one-way valve 20 features on one-way air flow. In an embodiment of the prior art, the valve member 40 is made from transparent polyvinyl chloride (PVC) and having a film 41, a stem 42 and a head 43 on a rear end of the stem 42. The fluid in the container 10 such as air passes through a plurality of holes 32 on the base 30 to flow out when the film 41 is opened due to deformation or contraction. The base 30 is sealed by the film 41 to prevent the fluid such as gas or liquid from flowing through the holes 32 of the base 30 and entering the container 10 when the film 41 turns back to the original shape. The sealing of the base 30 is further enhanced by positive pressure on outer surface of the film 41.

As shown in FIG. 2, the holes 32 are divided by a plurality of radial blades 33. The radial blade 33 radiates from a circular seat 34 to the base 10 while an insertion hole 35 is at a center of the circular seat 34. The head 43 on the rear end of the stem 42 of the valve member 40 is passed through the opening 35, as shown in FIG. 3. The inner diameter of the opening 35 of the circular seat 34 is smaller than an outer diameter of the head 43. The valve member 40 is made from an elastic material so that the head 43 is compressed while being passed through the opening 35 of the circular seat 34 and then is stretched on the other side of the circular seat 34. In the stretched state, the lower surface of the head 43 is supported by the circular seat 34.

Refer to FIG. 3, the base 30 is mounted in the container 10 and fixed on a certain position of the container 10. Thereby air flow causes deformation of the film 41. When a part of the film 41 is away from the base 30, air flows through the holes 32. During exhaustion, air flow escaped from the container 10 is indicated by an arrow A in FIG. 3. When the film 41 is lifted, the head 43 is located behind the circular seat 34 to prevent the valve member 40 from getting out of the base 30. When the air stops flowing out, the film 41 turns back to the position against the base 30 and sealing the base 30 for preventing the fluid from passing through the one-way valve and flowing in the opposite direction (the direction opposite to the arrow A indicated).

Figure 4:
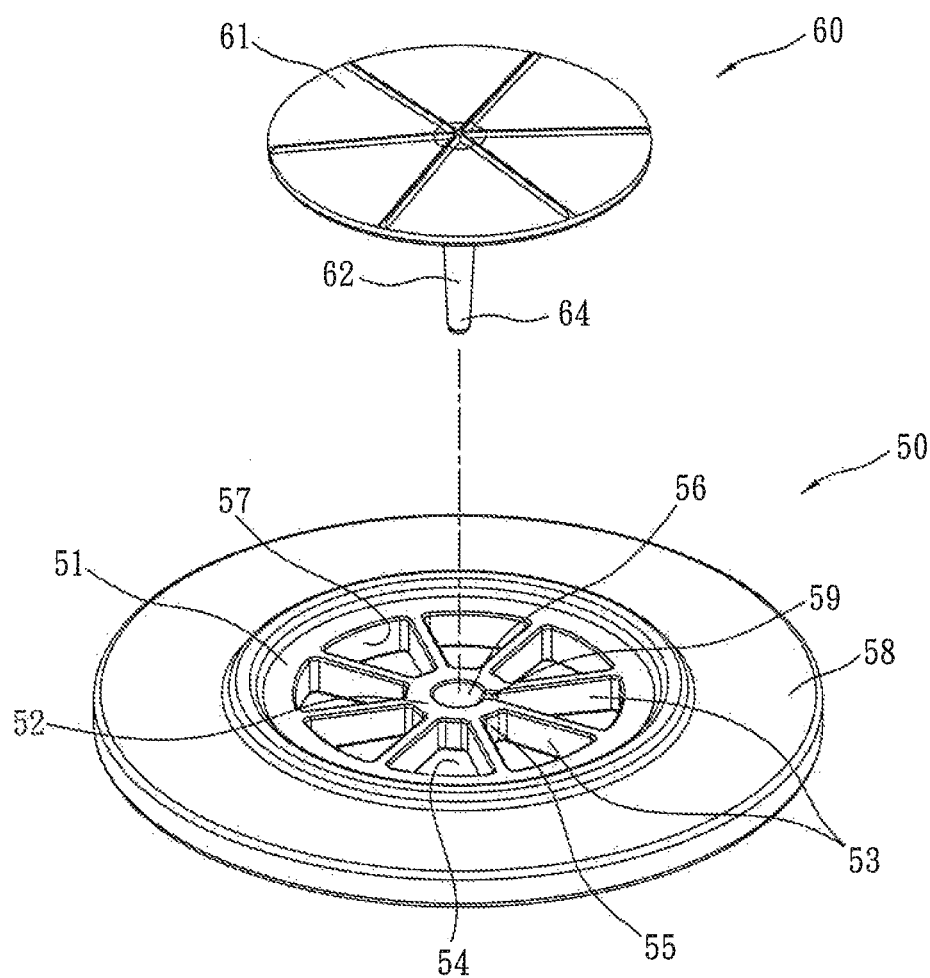
FIG. 4 is an explosive view of an embodiment according to the present invention.

Refer to FIG. 4, a one-way valve of the present invention includes a valve seat 50 and a valve member 60.

As shown in FIG. 4, the valve seat 50 is composed of an outer circular base 51, an inner circular base 52 and a plurality of ribs 53. The outer circular base 51 is disposed around a hole 54 while the inner circular base 52 is arranged at the center of the hole 54. The inner circular base 52 includes a circular sidewall 55 around an opening 56. The opening 56 and the hole 54 are concentric. The ribs 53 are radially extended from the circular sidewall 55 to an inner sidewall 57 of the outer circular base 51 so that the hole 54 is divided into a plurality of small holes. Moreover, the valve seat 50 further includes a flange 58 projecting radially from an outer wall of the outer circular base 51. The valve seat 50 is inserted through a hole on the container (not shown in figure) and then is fixed on the container sealingly by the flange 58.

The valve member 60 is disposed on the valve seat 50 for opening the hole 54 at a first state or closing the hole 54 at a second state. The valve member 60 consists of a membrane portion 61 and a rod portion 62.

The membrane portion 61 is in contact with a part of the outer circular base 51 around the hole 54. While in a first state, the membrane portion 61 is in contact with the whole circumference of the hole 54 so as to close the hole 54 on the valve seat 50. While in a second state, at least a part of the membrane portion 61 originally in contact with the outer circular base 51 is apart from each other, allowing the fluid to pass through the hole 54 of the valve seat 50. The membrane portion 61 is switched from the first state to the second state by deformation thereof.

Figure 5:
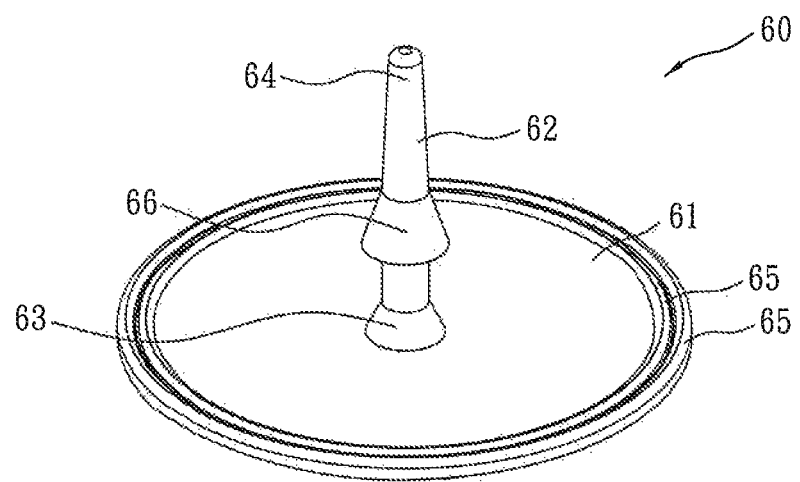
FIG. 5 is a perspective view of a valve member of an embodiment according to the present invention.
Figure 6:
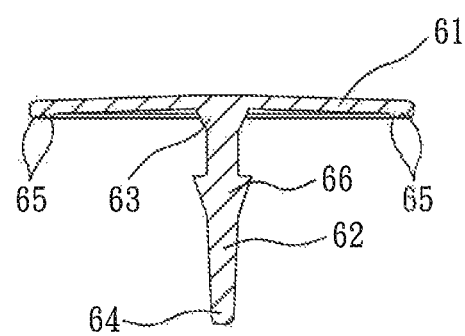
FIG. 6 is a longitudinal sectional view of a valve member of an embodiment according to the present invention.
Figure 7:
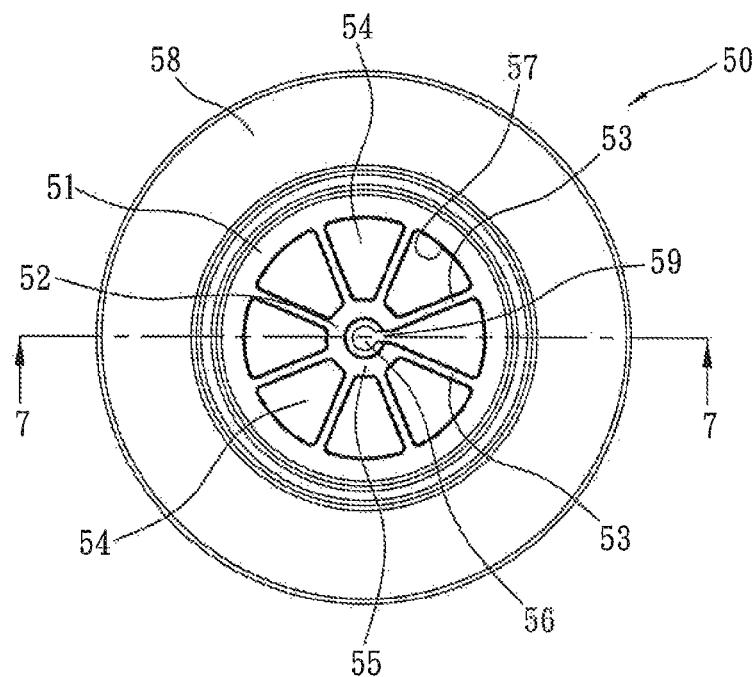
FIG. 7 is a top view of a base of an embodiment according to the present invention.
Figure 9:
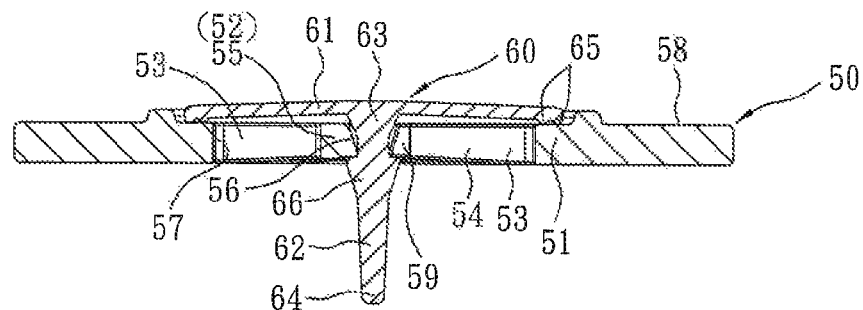
FIG. 9 is a longitudinal sectional view of a valve member of the embodiment in FIG. 6 disposed on a base in FIG. 8.

Refer to FIG. 5, the rod portion 62 includes a fixing end 63 connected to one side of the membrane portion 61 and a movable end 64 opposite to the fixing end 63. The rod portion 62 is able to be passed through the opening 56 of the inner circular base 52. One side of the membrane portion 61 is arranged with at least one ring 65 projecting therefrom. When the valve member 60 is against the outer circular base 51 and in a sealed position (as shown in FIG. 9), the ring 65 is against the outer circular base 51 to form a tight seal around the hole 54. As shown in FIG. 5, when the number of the ring 65 is two, the rings 65 are spaced with an interval therebetween.

Figure 10:
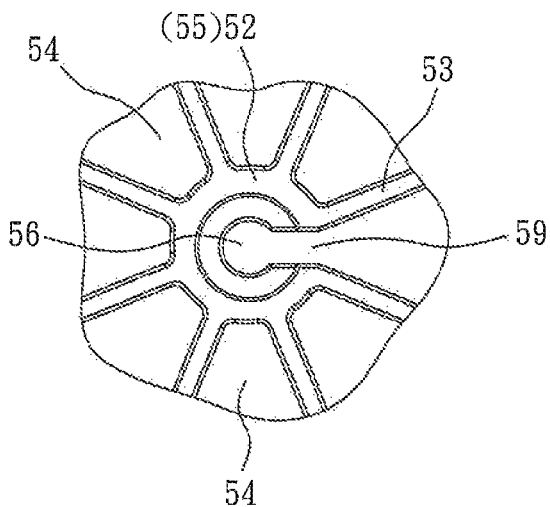
FIG. 10 is a partial enlarged view of the embodiment in FIG. 7 showing a shape of a gap of an inner circular base.
Figure 11:
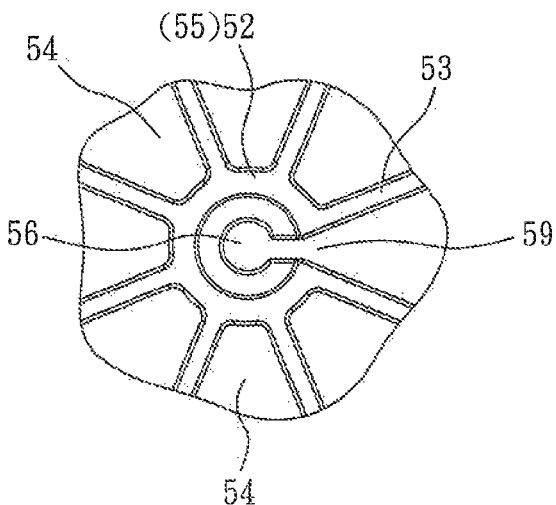
FIG. 11 is another partial enlarged view of the embodiment in FIG. 7 showing a shape of a gap of an inner circular base.

Back to FIG. 4, at least one gap 59 is disposed radially on the circular sidewall 55 of the inner circular base 52 of the valve seat 50. The gap 59 is vertically penetrating the circular sidewall 55 for allowing the rod portion 62 of the valve member 60 to be passed therethrough radially. The rod portion 62 of the valve member 60 is first inserted into the hole 54 axially and then radially passed through the gap 59 of the inner circular base 52 to be mounted into the opening 56 of the inner circular base 52. The width of the gap 59 on the inner circular base 52 is smaller than an outer diameter of the rod portion 62 of the valve member 60. The valve member 60 is made from a kind of elastic material. Thus the rod portion 62 is compressed firstly while being passed through the gap 59 of the inner circular base 52 and then is expanded at the other side. While being expanded, the surface around the rod portion 62 is against an inner surface on the circular sidewall 55 of the inner circular base 52, as shown in FIG. 9. Refer to FIG. 10 and FIG. 11, the gap 59 of the inner circular base 52 is arranged between the two adjacent ribs 53 so as to maintain the overall structural strength.

Back to FIG. 5, a positioning part 66 is disposed on the rod portion 62 of the valve member 60, and close to the fixing end 63 of the rod portion 62. There is an interval between the positioning part 66 and the fixing end 63. The positioning part 66 is projecting from the outer surface of the rod portion 62. The cross section of the positioning part 66 can be rectangular, round or tapered from the end of the rod portion 62 with the fixing end 63 to the end of the rod portion 62 with the movable end 64. When the valve member 60 is assembled with the valve seat 50, the rod portion 62 of the valve member 60 is mounted into the opening 56 of the inner circular base 52 and is located at a preset position. Now the opening 56 and the rod portion 62 are about concentric and the inner circular base 52 is stopped between the membrane portion 61 of the valve member 60 and the positioning part 66 of the rod portion 62. The surface of the positioning part 66 is leaning against and supported by the inner circular base 52.

Figure 8:
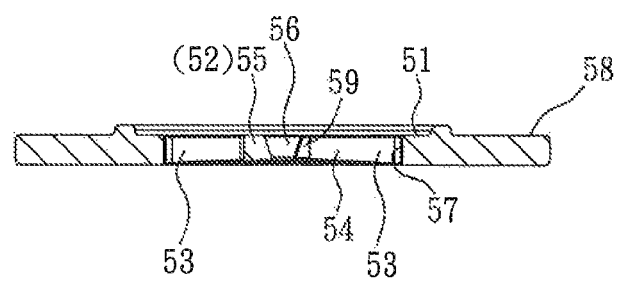
FIG. 8 is a longitudinal sectional view taken along line 8-8 of the embodiment in FIG. 7 according to the present invention.

As shown in FIG. 8 and FIG. 9, the longitudinal section of the opening 56 of the inner circular base 52 is funnel-shaped. Refer to FIG. 10, two sides of the gap 59 of the inner circular base 52 are parallel as viewed axially from the opening 56 of the inner circular base 52. Refer to FIG. 11, the gap 59 of the inner circular base 52 is funnel-shaped as viewed axially from the opening 56 of the inner circular base 52.

The above embodiment of the present invention is not only applied to a container. The container in FIG. 1 is only for appropriate description. In the figure, a solid object with a container thereof is provided. An opening for mounting the one way valve is arranged at a preset position of the solid object. The opening is communicated with the container. Those skilled in the art would understand that the one way valve is sealingly fixed on the opening of the solid object.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A one way valve comprising:
a valve seat having an outer circular base disposed around a hole, an inner circular base arranged at a center of the hole and having a circular sidewall around an opening while the opening and the hole are concentric, wherein a longitudinal section of the opening of the inner circular base is funnel shape, and a plurality of ribs that are radially extended from the circular sidewall to an inner sidewall of the outer circular base for dividing the hole into plurality of equal openings;
a valve member disposed on the valve seat for opening and closing the hole and having:
a membrane portion in contact with a part of the outer circular base around the hole; the membrane portion is in contact with the whole circumference of the hole while in a first state thereof so as to close the hole on the valve seat; while in a second state, at least a part of the membrane portion originally in contact with the outer circular base is apart from each other, allowing at least one fluid to pass through the hole of the valve seat; the membrane portion is switched from the first state to the second by deformation thereof;
a rod portion having a fixing end connected to one side of the membrane portion, and a moveable end opposite to the fixing end;
a positioning part is disposed on the rod portion of the valve member and adjacent to the movable end of the rod portion, the positioning part is projecting outward from an outer surface of the rod portion;
a cross section of the positioning part is in a shape selected from the group consisting of rectangular, round or tapered inwardly in the direction from the fixing end to the movable end, and able to be passed through one of the plurality equal openings;
wherein at least one gap is set radially on the circular sidewall of the inner circular base of the valve seat and is vertically penetrating the circular sidewall to allow the rod portion of the valve member to be passed through radially; the rod portion of the valve member and the positioning part to first inserted into the one of the plurality equal openings axially and then the rod portion radially passed through the gap and mounted into the opening of the inner circular base so that the rod portion is axially retained between the membrane portion of the valve member and the positioning part.

2. The one way valve as claimed in claim 1, wherein the valve seat further includes a flange projecting radially from an outer wall of the outer circular base.

3. The one way valve as claimed in claim 1, wherein the gap of the inner circular base of the valve seat is located between the two adjacent ribs.

4. The one way valve as claimed in claim 1, wherein a width of the gap of the inner circular base of the valve seat is smaller than an outer diameter of the rod portion of the valve member.

5. The one way valve as claimed in claim 1, wherein two sides of the gap of the inner circular base of the valve seat are parallel as viewed axially from the opening of the inner circular base.

6. The one way valve as claimed in claim 1, wherein the gap of the inner circular base of the valve seat is funnel-shaped as viewed axially from the opening of the inner circular base.

7. The one way valve as claimed in claim 1, wherein at least one ring is arranged at and projecting from one side of the membrane portion.

* * * * *